United States Patent [19]

Bonis

[11] 4,128,381
[45] Dec. 5, 1978

[54] SYSTEM FOR PREVENTING MANDREL DEFLECTION IN MOLDING OF THERMOPLASTIC MATERIALS

[75] Inventor: Laszlo J. Bonis, Framingham, Mass.

[73] Assignee: Composite Container Corporation, Natick, Mass.

[21] Appl. No.: 873,655

[22] Filed: Jan. 30, 1978

Related U.S. Application Data

[63] Continuation of Ser. No. 713,791, Aug. 12, 1976, abandoned.

[51] Int. Cl.² .................. B29F 1/03; B29D 23/02; B29C 1/06
[52] U.S. Cl. .................. 425/468; 425/577; 425/DIG. 5; 425/562; 249/63
[58] Field of Search .......... 425/242 R, 245, 247, 425/249, 468, DIG. 5, 436, 441, 444, 567, 577, 562; 249/63, 64, 66, 66 C, 67, 68, 444, 468, 245, 247, 246, 249

[56] References Cited

U.S. PATENT DOCUMENTS

| | | | |
|---|---|---|---|
| 2,361,348 | 10/1944 | Dickson et al. | 425/468 X |
| 2,684,502 | 7/1954 | Pauloe | 264/266 X |
| 2,822,578 | 2/1958 | Lobell | 249/67 |
| 2,825,093 | 3/1958 | High | 425/468 |
| 3,124,842 | 3/1964 | Moormann | 425/468 X |
| 3,301,928 | 1/1967 | Plymale | 425/468 X |
| 3,473,197 | 10/1969 | Wilds et al. | 425/577 |
| 3,481,002 | 12/1969 | Dreps | 425/468 X |
| 3,492,387 | 1/1970 | Larson | 425/567 X |
| 3,509,603 | 5/1970 | Halsall et al. | 425/577 |
| 3,752,434 | 8/1973 | Herter | 425/468 X |
| 3,767,156 | 10/1973 | Sullivan et al. | 425/468 X |

Primary Examiner—J. Howard Flint, Jr.

[57] ABSTRACT

A system for preventing a mandrel located inside a mold from deflecting during the initial stage of the injection of thermoplastic material into the volume defined by the mandrel and mold is provided. A reciprocating centering member is coupled to a supply of thermoplastic material and is coaxially positioned with respect to the free end of the mandrel. During the initial stage of injection, the force generated by the injection pressure will urge the centering member into a recess defined by the mandrel. The centering member defines a fluid flow channel permitting the thermoplastic to be injected via the channel into the volume defined by the mandrel and mold. When substantial injection has occurred, the mold back pressure and a spring bias will move the centering member out of engagement with the mandrel.

2 Claims, 4 Drawing Figures

SYSTEM FOR PREVENTING MANDREL DEFLECTION IN MOLDING OF THERMOPLASTIC MATERIALS

This is a continuation of application Ser. No. 713,791, filed Aug. 12, 1976 now abandoned.

BACKGROUND OF THE INVENTION

This invention relates to an improved system for preventing the deflection of a mandrel located inside a mold during thermoplastic injection molding. As used herein, the term "injection molding" includes all types of injection molding and also injection blow molding.

In injection molding and injection blow molding of thermoplastic materials, molten plastic under high pressure is injected into a cavity formed by a mold and a mandrel located inside the mold. This mandrel is rigidly held in place at one end, but is unsupported or free at the other end.

A common problem encountered with this arrangement is elastic deflection of the mandrel. Such elastic deflection is caused by the asymmetrical flow of plastic into the mold cavity, a phenomenon which in practice is unavoidable. The resulting lateral force on the mandrel can lead to substantial deflection, since the general arrangement is that of a relatively slender cantilever beam being subjected to lateral force at the free end thereof. The result is a molding with uneven wall thickness and, in severe cases, only partial filling of the mold cavity.

In conventional injection molding, in order to produce thin structures it is necessary to inject into a very narrow symmetrical area between the mandrel and the mold where the symmetry of the area may be two, three, four, sixfold or of rotational symmetry. Such injection requires excessive injection pressure typically resulting in uneven wall distribution, particularly when a relatively slender configuration is involved.

In conventional injection blow molding or in the case of dual-wall containers, it is desirable to use as small an amount of material as possible for reasons of economy. Because bending forces increase with decreasing parison wall thickness and relative eccentricity of the parison is inversely proportional to the nominal wall thickness for a given mandrel deflection, at present it is necessary to make the wall thickness of the parison 0.05 inch or larger. Using an average blow ratio of three, this results in a wall thickness of 0.166 inch or larger for the finished container. In many container constructions, however, a 0.004 inch wall thickness would be satisfactory, but such a wall thickness cannot be accomplished because of the above-described limitations.

The mandrel deflection problem is most severe when the mandrel is slender, i.e., a high length to diameter ratio, as is the case with most bottles, and when the mold cavity itself is so narrow that very high injection pressures are necessary to fill the cavity with plastic, thus allowing high bending forces to be generated at the free end of the mandrel.

It is, therefore, an object of the present invention to provide a system for preventing the mandrel from deflecting during molding of thermoplastic materials, by pinning or anchoring the mandrel during the initial stage of injection, without interfering with the complete filling of the mold cavity in the final stage of injection.

Molten plastic must at or toward the conclusion of the injection cycle completely surround the free end of the mandrel in order to form a full parison without a hole on the body from the anchoring pin and make this parison suitable for blow molding. To this end, the present invention provides a temporary anchoring during the initial stage of injection when the bending stresses are high, but the anchoring is withdrawn during the final stage of injection when the bending stresses are relieved, thus allowing complete filling of the mold cavity including the point of anchoring.

Another object of the present invention is to provide a mandrel deflection prevention system which is relatively simple in construction and efficient in operation.

Other objects and advantages of the present invention will become apparent as the description proceeds.

SUMMARY OF THE INVENTION

The invention is useful in a system for injection molding of thermoplastic materials including a mold, a mandrel located inside the mold an having a free end located inside the mold, and means for supplying thermoplastic material. The improvement comprises a centering member coupled to the thermoplastic material supplying means. The centering member defines a channel which communicates with an outlet of the thermoplastic supplying means.

The mandrel has means for engaging the centering member during an initial stage of injection whereby the centering member will aid in preventing deflection of the free end of the mandrel during engagement thereof. The centering member channel is located to communicate with the volume defined by the mold and the mandrel during engagement of the centering member and the mandrel. In this manner, the thermoplastic material exiting the supplying means will flow through the channel and into the volume during such engagement.

Means are provided for enabling reciprocating movement of the centering member. In this manner, the centering member will engage the mandrel during the initial stage of injection and will be free of the mandrel when substantial injection has occurred.

In the illustrative embodiment, the centering member's channel is an axial bore defined by the centering member and a radially extending fluid flow path adjacent an end of the centering member communicating with the bore. The radially extending fluid flow path is located for communication with the volume defined by the mold and the mandrel during the initial stage of injection.

In the illustrative embodiment, the mandrel is generally cylindrical and defines a central recess at its free end for receiving an end of the centering member during the initial stage of injection. In order to effect reciprocating movement of the centering member, a spring is provided which normally biases the centering member out of engagement with the mandrel. The spring provides a tension that is overcome by the force of injection pressure during the initial stage of injection and the spring aids in withdrawing the centering member from the mandrel when substantial injection has occurred.

A more detailed explanation of the invention is provided in the following description and claims, and is illustrated in the accompanying drawings.

DETAILED DESCRIPTION OF THE ILLUSTRATIVE EMBODIMENT

Figure 1:
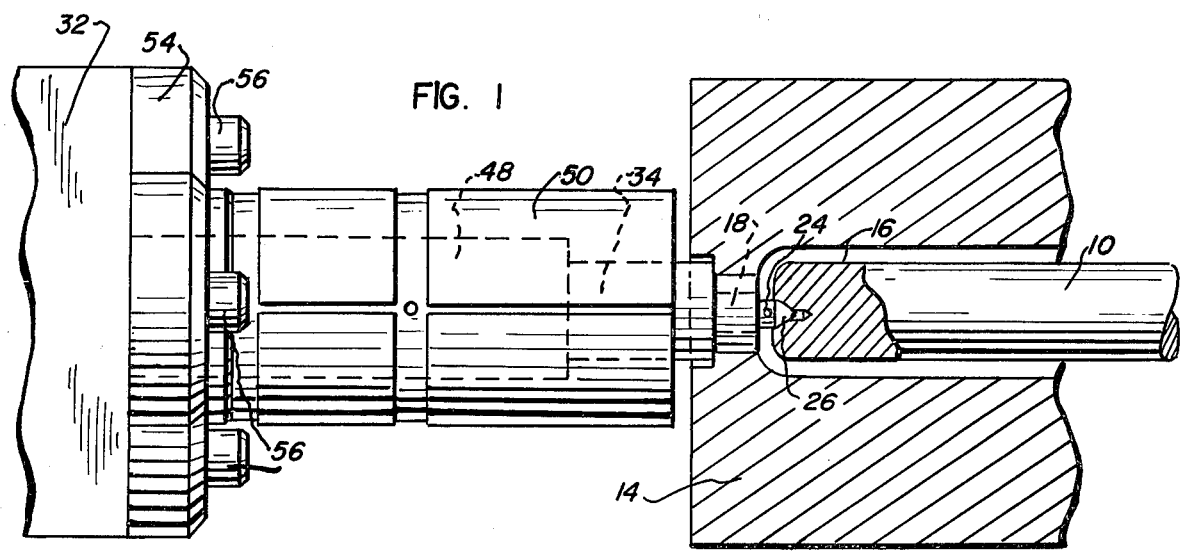
FIG. 1 is a fragmentary elevational view, partially broken for clarity, showing a mandrel deflection prevention system constructed in accordance with the principles of the present invention.

Referring to the drawings, a cylindrical or other appropriately shaped mandrel 10 having a free end 12 is located inside a mold 14. A volume 16 is defined by mandrel 10 and mold 14, with volume 16 being the volume which thermoplastic is injected into during the molding operation.

Figure 4:
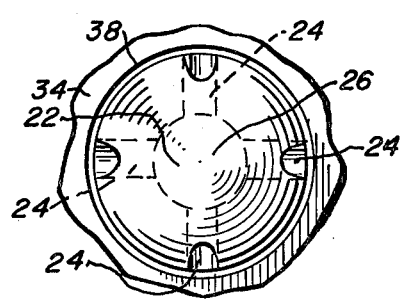
FIG. 4 is an end view of the centering member of the system of FIG. 1.

Free end 12 of mandrel 10 defines a centrally located recess 17 which is adapted for receiving a centering member 18 during injection. Centering member 18 is generally symmetrical about its longitudinal axis, is coaxial with mandrel 10 and defines a channel 20 which forms a fluid flow channel for the thermoplastic material being injected. Channel 20 comprises an axial bore 22 and four radially extending fluid flow paths 24, located at end 26 of centering member 18. Fluid flow paths 24 communicate with bore 22, as shown most clearly in FIG. 4. If desired, flow paths 24 may be of different sizes and more or less than four may be used.

End 28 of centering member 18 communicates with an outlet 30 of manifold 32, which manifold supplies thermoplastic material for injection. Thus the injection flow path is via channel 30, bore 22 and radially extending fluid flow paths 24 to volume 16.

A sleeve 34 is positioned about an end portion of centering member 18, to guide the centering member and to form a fluid chamber 36. A guiding surface is provided by internal wall 38 of sleeve 34, which has a diameter only slightly greater than the external diameter of the portion 40 of centering member 18 which moves within the opening defined by wall 38. The tolerance of the fit between wall 38 of sleeve 34 and the circumference of portion 40 acts as a seal when the centering member is not engaging the mandrel.

The volume between wall 38 and portion 40 is large enough to permit penetration of thermoplastic material during injection, and it communicates with chamber 36. In this manner, chamber 36 fills with thermoplastic material during the injection operation and aids in forcing centering member 18 to withdraw from mandrel 10 when substantial injection has occurred.

A spring seat 44 is provided by an end wall of sleeve 34 for seating spring 46 which normally biases centering member 18 in the direction of withdrawal from mandrel 10. Sleeve 34 is held in place generally by a spacer 48 which is fastened to housing 50. A guide 52 is provided for supporting end 28 of centering member 18 and for sealing that end. There is a running fit between guide 52 and centering pin 18 with a tolerance such that the material being molded is unable to penetrate the space.

A clamp 54 is provided to secure the assembly against manifold 32, with clamp 54 being fastened to manifold 32 by suitable fastening means, such as bolts 56.

Spring 46 is a high temperature spring, an example of such (although no limitation is intended), being a 50 pound, ground inconel compression spring. The spring acts to normally bias centering member 18 out of engagement with mandrel 10, with the force provided by spring 46 being overcome by the force of injection pressure during the initial stage of injection.

Figure 2:
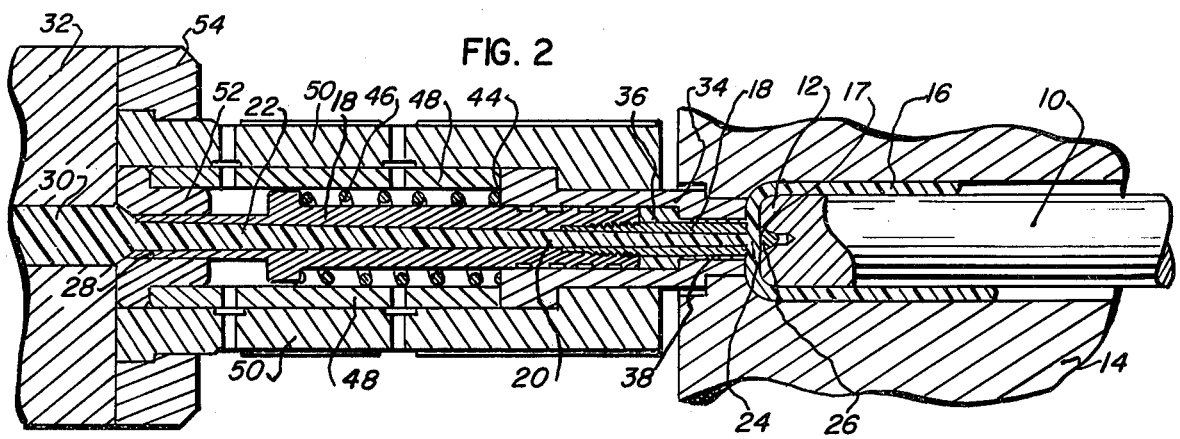
FIG. 2 is a cross-sectional view thereof, showing the centering member in its extended position during an initial stage of injection.
Figure 3:
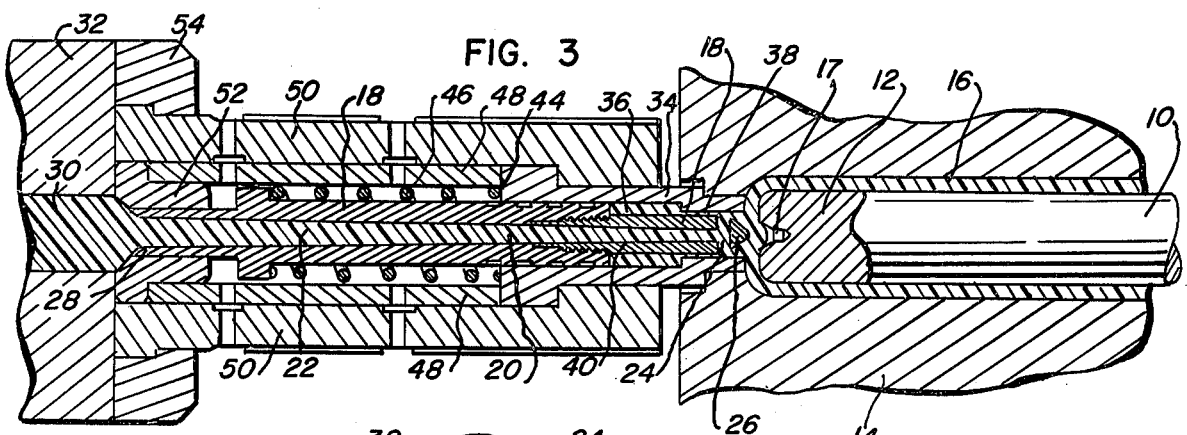
FIG. 3 is a cross-sectional view thereof, showing the centering member in its retracted position after substantial injection has occurred.

Thus in the operation of the system, centering member 18 is normally withdrawn from mandrel 10. As injection begins, the molten thermoplastic material will flow via channel 30 into channel 20 and the initial injection pressure will act upon end 28 of centering member 18 to force centering member 18 in the rightward direction (with respect to FIGS. 1-3), thereby urging end 26 into into recess 17 (as shown in FIG. 2). The molten thermoplastic material will flow via bore 22 and radial fluid flow paths 24 into volume 16 and also will penetrate the space between wall 38 and portion 40 and will enter chamber 36. After substantial injection has occurred, the mold back pressure will overcome the forward force and will urge centering member 18 to withdraw from the mandrel (as shown in FIG. 3). However, the free end of the mandrel will be maintained in its correct position during the initial stage of the injection, when the bending forces on the mandrel are greatest.

Although an illustrative embodiment of the invention has been shown and described, it is to be understood that various modifications and substitutions may be made by those skilled in the art without departing from the novel spirit and scope of the present invention.

I claim:

1. Apparatus for injection molding with improved freedom from mandrel deflection which comprises a mold element for forming outer molding surfaces,
   said mold element including therein a first opening extending from a first end to a second end and a second opening extending from said second end of said first opening in a direction away from said first end of said first opening,
   said first opening in use shaping a portion of said outer molded surfaces,
a mandrel mounted in said first opening to extend longitudinally therin therealong from a first mandrel end to a second mandrel end, first and second ends of said mold element and said mandrel being each in the same direction relative to the other,
said mandrel being cantilevered from a mounting at said first end of said mandrel and having an outside surface defining in use inner molded surfaces,
a sleeve,
   said sleeve being mounted in said second opening, and
   having a tip in use shaping therearound a further portion of said outer molded surfaces,
thermoplastic material supply means,
a mandrel second end centering member,
   said member being mounted for reciprocal movement toward and away from said mandrel second end,
   said member having therethrough a passage for moving thermoplastic material from said supply means into a cavity between said mold element and said mandrel,
   said member including a first surface interfering with flow of said thermoplastic material therethrough and urged thereby toward said mandrel second end,
   said member including a second surface positioned around said passage and in parallel flow relation to said cavity to receive thermoplastic material as said cavity fills and thereby exert on said member a force urging said member away from said mandrel second end, and said member including a third surface for coacting with further biasing means biasing said member away from said mandrel second end, and said further biasing means, forces on said first surface overriding the sum of the forces on said second surface and said third surface to hold said centering member in centering engagement with said mandrel second end until a portion of said cavity is filled, whereupon said forces on said second surface and said third surface override said forces on said first surface whereby said member is moved away from said mandrel second end, said mandrel second end and said member each including centering means cooperating to support said mandrel centrally in said cavity until said sum is no longer overriden.

2. The apparatus of claim 1 in which said further biasing means is a spring.

* * * * *